(12) United States Patent
Navabi-Shirazi et al.

(10) Patent No.: US 9,185,768 B2
(45) Date of Patent: Nov. 10, 2015

(54) SHORT CIRCUIT PROTECTION

(71) Applicant: Apple Inc., Cupertino, CA (US)

(72) Inventors: Mohammad J. Navabi-Shirazi, Cupertino, CA (US); Asif Hussain, San Jose, CA (US); Jingdong Chen, San Jose, CA (US); Manisha P. Pandya, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 13/940,181

(22) Filed: Jul. 11, 2013

(65) Prior Publication Data

US 2014/0139143 A1 May 22, 2014

Related U.S. Application Data

(60) Provisional application No. 61/727,626, filed on Nov. 16, 2012, provisional application No. 61/801,285, filed on Mar. 15, 2013.

(51) Int. Cl.
| | |
|---|---|
| *G06F 1/26* | (2006.01) |
| *H05B 33/08* | (2006.01) |
| *H02M 3/156* | (2006.01) |
| *H02M 1/00* | (2007.01) |

(52) U.S. Cl.
CPC .............. *H05B 33/0887* (2013.01); *G06F 1/26* (2013.01); *H02M 3/156* (2013.01); *H05B 33/0815* (2013.01); *H05B 33/0884* (2013.01); *H02M 2001/0025* (2013.01); *Y02B 20/341* (2013.01)

(58) Field of Classification Search
CPC .......... H05B 33/0887; H05B 33/0884; H05B 33/0815; Y02B 20/341; H02M 2001/0025; H02M 3/156; G06F 1/26
See application file for complete search history.

(56) References Cited

U.S. PATENT DOCUMENTS

| | | | |
|---|---|---|---|
| 7,045,993 B1 * | 5/2006 | Tomiyoshi | 323/224 |
| 7,642,805 B1 | 1/2010 | Yinn et al. | |
| 7,906,868 B2 | 3/2011 | Ferguson et al. | |
| 8,334,662 B2 | 12/2012 | Jin et al. | |
| 2006/0082943 A1 * | 4/2006 | Chiu | 361/93.1 |
| 2006/0284609 A1 * | 12/2006 | Weng et al. | 323/286 |
| 2012/0182328 A1 | 7/2012 | Yoon et al. | |
| 2012/0217894 A1 * | 8/2012 | Chang et al. | 315/265 |

(Continued)

*Primary Examiner* — Jung Kim
(74) *Attorney, Agent, or Firm* — Downey Brand LLP

(57) ABSTRACT

A measured voltage drop across a power-line transistor is used as a sensing element to measure the current and detect an over-current condition for an LED backlight system. An over-current or short condition is detected when the measured voltage drop exceeds a threshold. Accurate detection of the over-current condition is achieved by calibrating the $R_{DS\text{-}ON}$ (i.e., internal resistance between drain and source, when transistor is on) of the power-line transistor. In one embodiment, the calibration of $R_{DS\text{-}ON}$ is performed by ramping down the threshold from an initial value and using the tripped threshold to determine the actual value for $R_{DS\text{-}ON}$. In another embodiment, the calibration of $R_{DS\text{-}ON}$ is performed by using two thresholds, a first threshold to calibrate $R_{DS\text{-}ON}$ and a second threshold to detect the over-current condition.

20 Claims, 12 Drawing Sheets

(56) References Cited

U.S. PATENT DOCUMENTS

| | | |
|---|---|---|
| 2013/0050174 A1 | 2/2013 | Kim et al. |
| 2013/0141322 A1 | 6/2013 | Hussain et al. |
| 2014/0266110 A1* | 9/2014 | Yuan et al. .................... 323/282 |
| 2015/0062108 A1* | 3/2015 | Archibald .................... 345/212 |

* cited by examiner

SHORT CIRCUIT PROTECTION

CROSS REFERENCE TO RELATED APPLICATIONS

This application claims the benefit of U.S. Provisional Application No. 61/727,626, filed Nov. 16, 2012 and entitled "BACKLIGHT IN-RUSH CONTROL AND ACCURATE SHORT CIRCUIT PROTECTION", and U.S. Provisional Application No. 61/801,285, filed Mar. 15, 2013 and entitled "SHORT CIRCUIT PROTECTION", both of which are incorporated herein by reference in their entirety for all purposes.

FIELD OF THE DESCRIBED EMBODIMENTS

The described embodiments relate generally to methods for short circuit detection and protection in integrated circuit chips and more particularly to methods for accurate short circuit detection and protection in LED (light emitting diode) backlight chips.

BACKGROUND

LED backlight chips with a boost converter often utilize a power-line FET (field effect transistor) to switch off the current from the supply when the chip is off. It is also necessary to protect against high current conditions created by a short circuit at the output. The power-line FET can be used to limit the current flow during the initial in-rush period and also to protect against output short circuit fault conditions.

Various short circuit detection methods are commonly used which utilize either a sense resistor or a replica device. These methods require additional components and also add to the system power loss. It is also possible to use a component already existing in the current flow path and use its impedance to measure current and detect an over-current condition. Because of the variation of the sensing element's impedance from one component to the next, these methods usually lack accuracy.

As such, it is desirable to have a method to improve the accuracy of short circuit detection in LED backlight chips using the resistance of a component already existing in the current flow path to detect an over-current condition.

SUMMARY OF THE DESCRIBED EMBODIMENTS

This specification describes various embodiments where the resistance of a component already existing in the current flow path can be used and calibrated to measure the current and detect an over-current condition. In one embodiment, a measured voltage drop across a power-line transistor is used as a sensing element to measure the current and detect an over-current condition. An over-current or short condition is detected when the measured voltage drop exceeds a threshold. Accurate detection of the over-current condition can be achieved by calibrating the $R_{DS-ON}$ (i.e., internal resistance between drain and source, when transistor is on) of the power-line transistor, so that the actual value for $R_{DS-ON}$ can be determined. In one embodiment, the calibration of $R_{DS-ON}$ can be performed in the factory, where the threshold is ramped down from an initial value while a known current is forced through the sensing element. A comparator trips when the measured voltage drop equals the falling threshold value. The tripped threshold value is then used to determine the actual value for $R_{DS-ON}$. In another embodiment, the calibration of $R_{DS-ON}$ during normal operation is performed by using two thresholds, a first threshold to calibrate $R_{DS-ON}$ and a second threshold to detect the over-current condition. The first threshold is first used to determine the actual value for $R_{DS-ON}$, which is then, in turn, used to reset the second threshold for accurate over-current detection.

In one embodiment, a method to accurately detect and prevent an over-current condition for a driver using a measured voltage drop across a power-line transistor for the driver is disclosed. The method includes: (1) setting a threshold voltage level to an initial value, (2) calibrating the driver with a known input current, (3) comparing, with a comparator, the measured voltage drop across the power-line transistor with the threshold voltage level while the threshold voltage level is ramping down from the initial value, (4) tripping the comparator to generate a tripped threshold voltage level when the measured voltage drop across the power-line transistor equals the threshold voltage level, (5) using the tripped threshold voltage level and the known input current to accurately determine an actual drain to source "on" resistance ($R_{DS-ON}$) for the power-line transistor, and (6) using the actual drain to source "on" resistance ($R_{DS-ON}$) for the power-line transistor to detect and prevent the over-current condition for the driver. In one embodiment, the method can perform step 6 by using the actual drain to source "on" resistance ($R_{DS-ON}$) for the power-line transistor to determine a calibrated threshold voltage level, and switching off the power-line transistor when the over-current condition for the driver occurs. The over-current condition for the driver occurs when the measured voltage drop across the power-line transistor exceeds the calibrated threshold voltage level. In one embodiment, the driver is a boost converter for LED (light emitting diode) backlighting.

In one embodiment, a device configured for accurate detection and prevention of over-current condition at an output of the device is disclosed. The device includes a power converter configured for converting an input power from an external supply to an output power at the output of the device. The device also includes a power-line transistor configured for switching on and off the input power from the external supply. The device further includes a comparator configured for comparing a measured voltage drop across the power-line transistor with a threshold voltage level. The device accurately determines an actual drain to source "on" resistance ($R_{DS-ON}$) for the power-line transistor by applying a known current through the power-line transistor and ramping down the threshold voltage level from an initial value until the measured voltage drop across the power-line transistor equals the threshold voltage level. The device uses the actual drain to source "on" resistance ($R_{DS-ON}$) for the power-line transistor to detect and prevent over-current condition for the device at the output of the device. In one embodiment, the device uses the actual drain to source "on" resistance ($R_{DS-ON}$) for the power-line transistor to determine a calibrated threshold voltage level. The over-current condition for the driver occurs when the measured voltage drop across the power-line transistor exceeds the calibrated threshold voltage level. In one embodiment, the device further includes a logic configured for switching on and off the power-line transistor. The power-line transistor is switched off when the over-current condition for the driver occurs.

In one embodiment, a method to use two threshold voltage levels and a measured voltage drop across a power-line transistor for a driver to accurately detect and prevent over-current condition for the driver is disclosed. The method includes: (1) setting a first threshold voltage level to a first initial value that protects the driver from entering the over-current condition during calibration, (2) setting a second threshold voltage level to a second initial value that is greater than the first initial value for the first threshold voltage level, (3) calibrating the driver under normal operating conditions with a known input current, (4) using a comparator and the first threshold voltage level to accurately determine an actual drain to source "on" resistance ($R_{DS-ON}$) for the power-line transistor when the measured voltage drop across the power-line transistor equals the first threshold voltage level, and (5) using the actual drain to source "on" resistance ($R_{DS-ON}$) for the power-line transistor to determine the second threshold voltage level for detecting and preventing over-current condition for the driver. In one embodiment, the method can perform step 5 by using the actual drain to source "on" resistance ($R_{DS-ON}$) for the power-line transistor to determine and set a calibrated second threshold voltage level, and switching off the power-line transistor when the over-current condition for the driver occurs. The over-current condition for the driver occurs when the measured voltage drop across the power-line transistor exceeds the calibrated second threshold voltage level. In one embodiment, the driver is a boost converter for LED (light emitting diode) backlighting.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION OF SELECTED EMBODIMENTS

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The present application discloses a method where the resistance of a component already existing in the current flow path can be used and calibrated to measure the current and detect an over-current condition. In one embodiment, the $R_{DS-ON}$ (i.e., internal resistance between drain and source, when transistor is on) of the power-line transistor can be used as the sensing element to measure the current and detect an over-current condition. In another embodiment, other resistances in series with the input current flow can be used in a similar manner for measurement of the current and detection of an over-current condition. For example, if a fuse or a ferrite bead is used at the input, its resistance can be used and, by using a similar calibration method as described in this application, an accurate short circuit detection limit can be implemented.

During the operation of the backlight system when the power-line transistor is fully turned on, voltage drop across the power-line transistor can be used to detect output short condition. The threshold is selected based on the expected range of $R_{DS-ON}$ (i.e., drain to source "on" resistance) values for the power-line transistor and the maximum allowable current during backlight operation. If this threshold is exceeded then the power-line transistor may be turned off by shorting its gate to its source.

Figure 1:
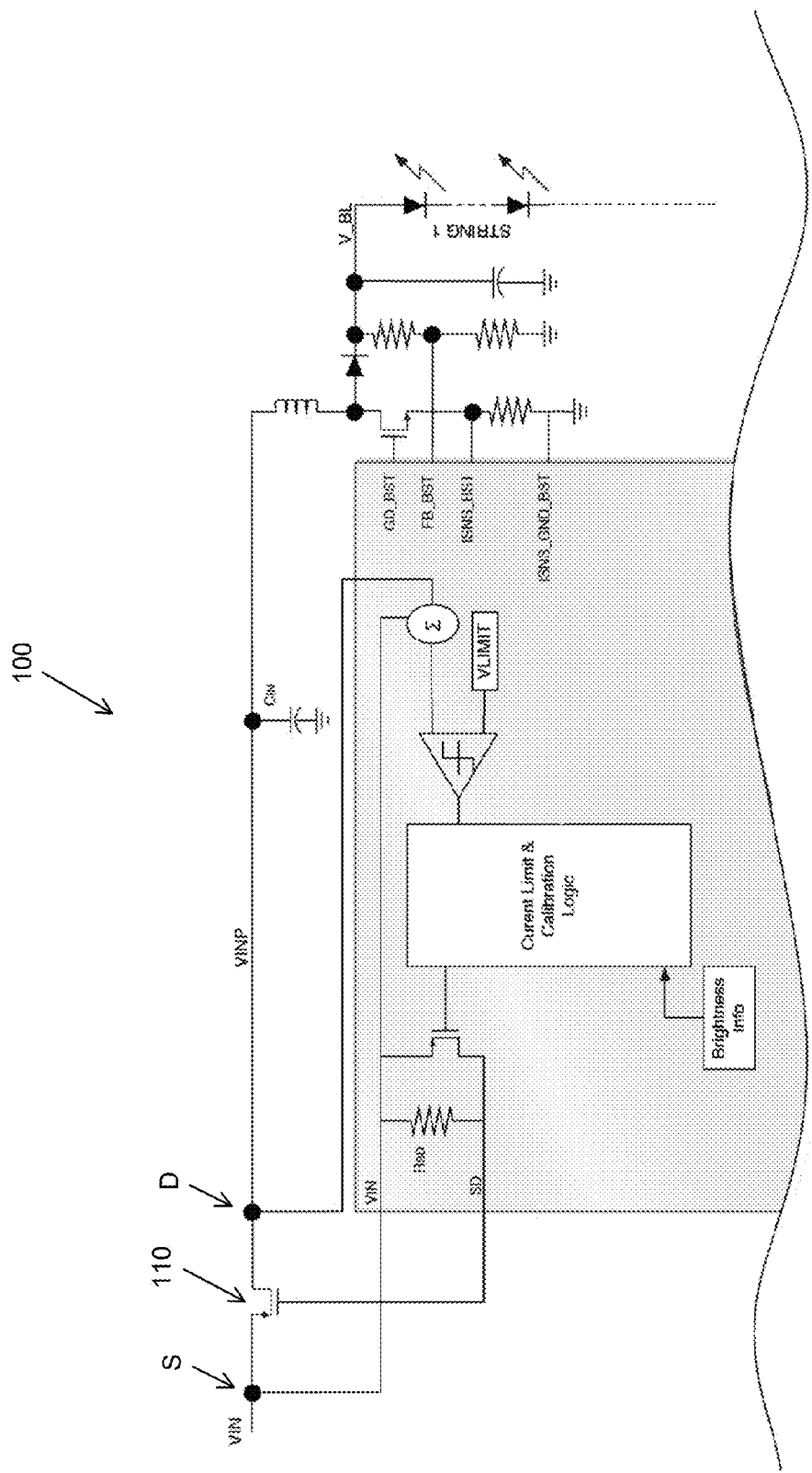
FIG. 1 illustrates a device that can use the $R_{DS-ON}$ (drain to source "on" resistance) of a power-line transistor as the sensing element for detecting and preventing an over-current condition.

FIG. 1 illustrates a device 100 that uses the $R_{DS-ON}$ of a power-line transistor 110 as the sensing element for detecting an over-current condition. During the operation of the backlight system, when the power-line transistor is fully turned on, voltage drop across the source S and drain D of the power-line transistor can be used to detect output short condition. The threshold (VLIMIT) is selected based on the expected range of $R_{DS-ON}$ values for the power-line transistor and the maximum allowable current during backlight operation. If this threshold (VLIMIT) is exceeded then the power-line transistor can be turned off by shorting its gate to its source. This threshold (VLIMIT) is exceeded when a high current flows through the power-line transistor 110, indicating that there are existing short or over-current conditions. In one embodiment, the power-line transistor can be a FET (field effect transistor). In one embodiment, the power-line transistor can be a MOSFET (metal-oxide-semiconductor field effect transistor).

Figure 2:
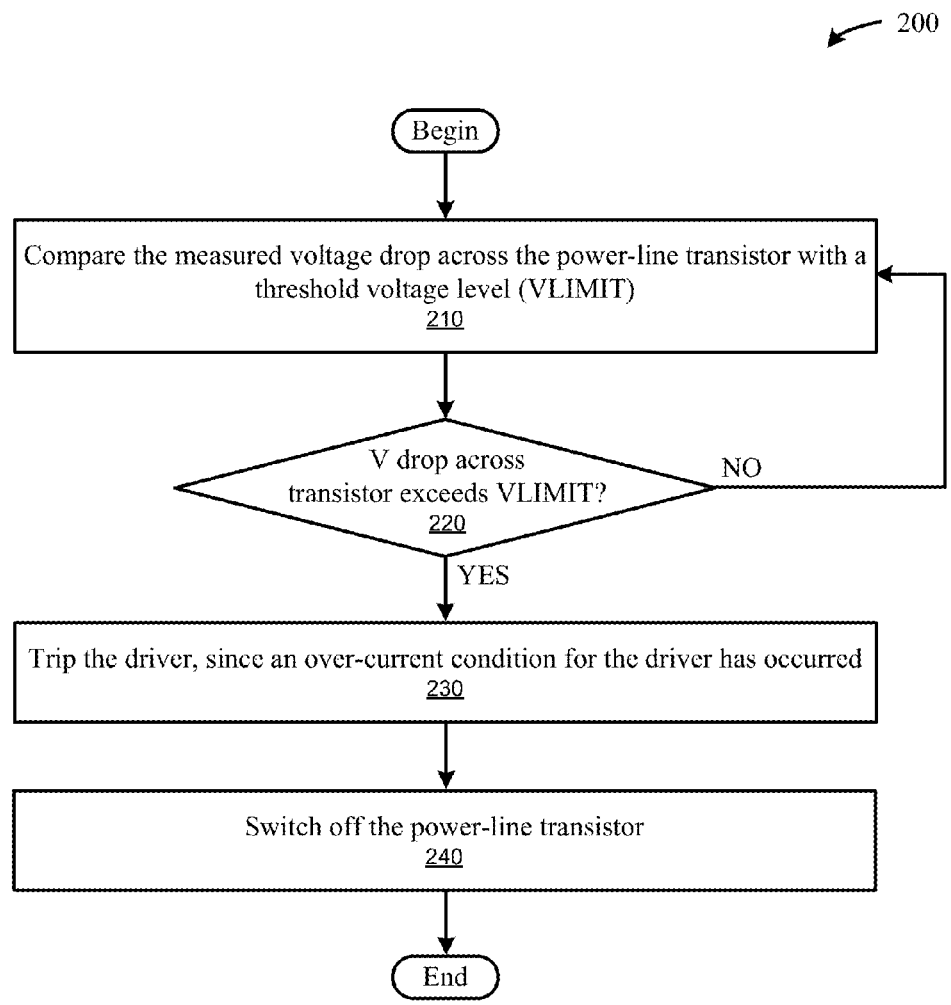
FIG. 2 is a flow chart of method steps to use the $R_{DS-ON}$ of the power-line transistor as the sensing element for detecting and preventing an over-current condition.

FIG. 2 illustrates a method embodiment to use the $R_{DS-ON}$ of the power-line transistor as the sensing element for detecting and preventing an over-current condition. As shown in FIG. 2, the method 200 begins at step 210, where the method compares the measured voltage drop across the power-line transistor with a threshold voltage level (VLIMIT). After step 210, the method proceeds to step 220, where there is a determination if the voltage drop across the power-line transistor has exceeded a threshold voltage level (VLIMIT). If the voltage drop across the power-line transistor has not exceeded the threshold voltage level (VLIMIT), then the method returns to step 210, where the method continues to compare the measured voltage drop across the power-line transistor with the threshold voltage level (VLIMIT). If the voltage drop across the power-line transistor has exceeded the threshold voltage level (VLIMIT), then the method proceeds to step 230, where the driver is tripped, since an over-current condition for the driver has occurred. After step 230, the method 200 proceeds to step 240, where it switches off the power-line transistor to prevent the over-current condition.

However, this method of pre-selecting the threshold (VLIMIT) based on the expected range of $R_{DS-ON}$ values can be inaccurate due to the variations in the $R_{DS-ON}$. As an example of the inaccuracies associated with this method, variations of various measured parameters from the above device are used for estimating the net expected variation in the current limit threshold ($I_{IN-LIMIT}$) used for determining an over-current condition. In the above device, differential voltage across the power-line transistor is measured and compared with a set current limit threshold voltage (VLIMIT) to determine an over-current condition. At the VLIMIT comparator trip point:

$$I_{IN-LIMIT} = VLIMIT/R_{DS-ON}$$

where $R_{DS-ON}$ tolerance=+/−50%

To calculate the VLIMIT tolerance, accuracies of the auto-zero comparator and the reference voltage are needed:

Auto-zero comparator accuracy=+/−20%
Reference voltage accuracy=+/−5%
Therefore, VLIMIT tolerance=$\pm\sqrt{(5^2+20^2)}$=+/−21%
and overall accuracy of $I_{IN-LIMIT}=\pm\sqrt{(50^2+21^2)}$=+/−54.2%

From the above calculation, it can be seen that most of the variation in the current limit threshold ($I_{IN-LIMIT}$) is coming from the $R_{DS-ON}$ of the external power-line transistor. Therefore, the drawback of this device is the dependence of the current limit threshold ($I_{IN-LIMIT}$) on the $R_{DS-ON}$ of the external power-line transistor.

Figure 3:
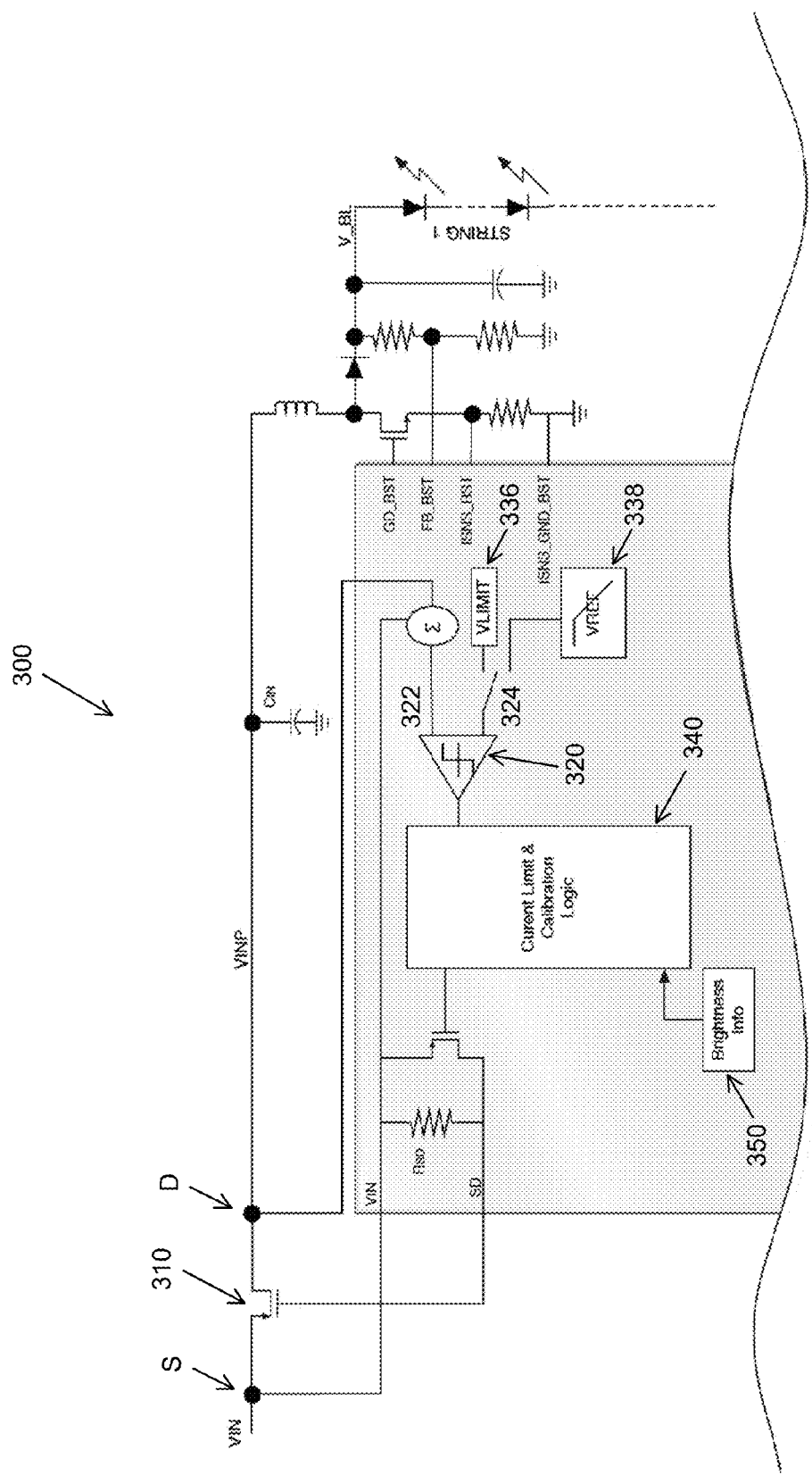
FIG. 3 illustrates a device which can use a threshold voltage that is ramping down to calibrate the $R_{DS-ON}$ of a power-line transistor, so that the actual $R_{DS-ON}$ value can be used for accurate detection and prevention of an over-current condition.

It is, therefore, desirable to calibrate the current limit threshold using the output current load information. Accordingly, this application discloses devices and methods for calibrating the current limit threshold using the output current load information that is available in a back-light application. One embodiment of such a device is shown in FIG. 3. In one embodiment, this device performs a self calibration routine in the factory to obtain an accurate value for $R_{DS-ON}$ of the external power-line transistor. The device saves this information in a non-volatile memory. Later, during normal operation of the device, this information is used to set an accurate current limit threshold.

FIG. 3 illustrates a device 300 which uses a threshold voltage that is ramping down to calibrate the $R_{DS-ON}$ of a power-line transistor 310, so that the actual $R_{DS-ON}$ value of the power-line transistor can be used for accurate detection and prevention of an over-current condition. Device 300 includes a power converter configured for converting an input power from an external supply to an output power at the output of the device, a power-line transistor 310 configured for switching on and off the input power from the external supply, and a comparator 320 configured for comparing a measured voltage drop across the power-line transistor 310 with a threshold voltage level. In FIG. 3, the external supply provides the input power to device 300 through input VIN. This input power is converted to an output power that is supplied to LED backlighting through output V_BL. The comparator 320 has two inputs. Input 322 receives a measured voltage drop across the source S and drain D of the power-line transistor 310. Input 324 can receive either a fixed threshold voltage level VLIMIT (336) or a changing threshold voltage level VREF (338) that is ramping down from an initial value to zero. Initially, input 324 receives the ramping down threshold voltage level VREF (338) to accurately determine the actual $R_{DS-ON}$ (drain to source "on" resistance) for the power-line transistor 310. Then the actual $R_{DS-ON}$ for the power-line transistor 310 is used to determine a calibrated threshold voltage level that is used to detect and prevent over-current condition for device 300. After the calibrated threshold voltage level has been determined, input 324 is switched to receive the fixed threshold voltage level (VLIMIT 336) that has been set to be equal to the calibrated threshold voltage level. An over-current condition for device 300 occurs when the measured voltage drop across the power-line transistor (i.e., input 322) exceeds the calibrated threshold voltage level (i.e., input 324 receiving VLIMIT set to the calibrated threshold voltage level). Device 300 also includes a logic 340 configured for switching on and off the power-line transistor 310. In one embodiment, logic 340 can switch off the power-line transistor 310 when an over-current condition for the driver has occurred. In one embodiment, the logic 340 can be a current limit and calibration logic. In one embodiment, the logic 340 can also receive input associated with brightness information 350.

Figure 4:
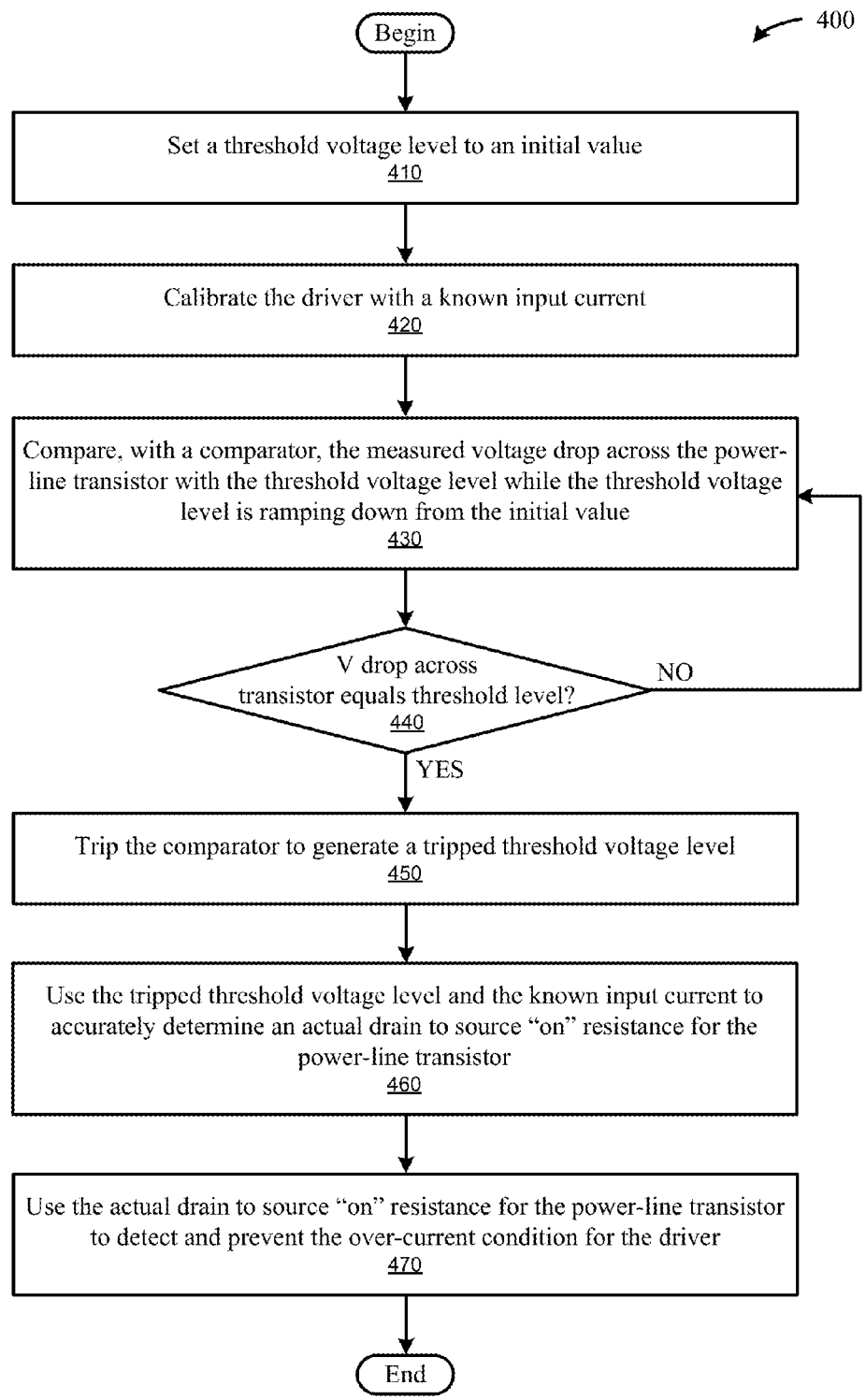
FIG. 4 is a flow chart of method steps to use a threshold voltage that is ramping down to calibrate the $R_{DS-ON}$ of a power-line transistor for accurate detection and prevention of an over-current condition.

FIG. 4 illustrates a method embodiment to use a threshold voltage that is ramping down to calibrate the $R_{DS-ON}$ of a power-line transistor and to use the accurately calibrated $R_{DS-ON}$ of the power-line transistor as the sensing element for detecting and preventing an over-current condition. As shown in FIG. 4, the method 400 begins at step 410, where the method sets a threshold voltage level to an initial value. After step 410, the method proceeds to step 420, where the method powers on the driver so that the driver is calibrated with a known input current. Then the method proceeds to step 430, where the method compares, with a comparator, the measured voltage drop across the power-line transistor with the threshold voltage level, while the threshold voltage level is ramping down from the initial value. In step 440, there is a determination if the voltage drop across the power-line transistor equals the falling threshold voltage level (VREF). If the voltage drop across the power-line transistor is not equal to the falling threshold voltage level (VREF), then the method returns to step 430, where the method continues to ramp down the threshold voltage level (VREF) and compare VREF with the measured voltage drop across the power-line transistor. If the voltage drop across the power-line transistor is equal to the falling threshold voltage level (VREF), then the method trips the comparator (step 450) to generate a tripped threshold voltage level (VREF). In subsequent step 460, the tripped threshold voltage level and the known input current are used to accurately determine an actual $R_{DS\text{-}ON}$ for the power-line transistor. After step 460, the method 400 proceeds to step 470, where it uses the actual $R_{DS\text{-}ON}$ for the power-line transistor to detect and prevent the over-current condition for the driver. It is not shown in method 400, but, in one embodiment, the actual $R_{DS\text{-}ON}$ for the power-line transistor is used to determine a calibrated threshold voltage level that is used to set the threshold voltage level for detecting the over-current condition for the driver.

Current Limit Sensing Using Factory Calibrated $R_{DS\text{-}ON}$ of the Power Line Transistor In one embodiment, a backlight chip, such as device 300 shown in FIG. 3, performs a self calibration routine in the factory and saves the information in a non-volatile memory. During normal operation of the backlight chip, this information is used to set an accurate current limit threshold.

In a backlight system, the load current is the current through the backlight LEDs and it is controlled by the backlight chip. At any given time, the backlight chip knows the output current with reasonable accuracy. This information can be reflected back to the input based on boost efficiency, and input and output voltages.

$$I_{IN}=I_{OUT}*V_{OUT}/(V_{IN}*Eff)$$

where
$I_{IN}$=input current
$I_{OUT}$=output current
$V_{OUT}$=output voltage
$V_{IN}$=input voltage
Eff=boost converter's expected efficiency at a given load The backlight driver is powered on during self-calibration. Before self-calibration, a current limit threshold based on a minimum expected $R_{DS\text{-}ON}$ is used by the device. This threshold should be high enough that even if the actual $R_{DS\text{-}ON}$ is at its maximum value, the current limit comparator is not tripped prior to calibration unless there is a real fault condition.

$$V\text{LIMIT(initial)}=I_{INmax}*R_{DS\text{-}ONmin}*k$$

where k is a scale factor allowing for margin
In one embodiment, k is greater than one. In one embodiment, the initial value of the threshold voltage level (VLIMIT) is set to be equal to VLIMIT(initial). In one embodiment, the initial value of the threshold voltage level protects the driver from entering the over-current condition during calibration.

In the absence of any error conditions, the driver is then placed in the self-calibrate mode. Once in the self calibrate mode, the driver first checks for current flow through $R_{DS\text{-}ON}$ when backlight LEDs are off. Only minimal bias currents should be flowing through the $R_{DS\text{-}ON}$. The reference voltage (VREF 338) to the current limit comparator 320 is ramped from its initial value down towards zero. Since the input current and the voltage drop across $R_{DS\text{-}ON}$ are very small, the comparator 320 should not trip or should trip at very low voltages. This step establishes that there are no existing short or over current conditions. In other words, before starting the step of calibrating the driver under normal operating conditions (i.e., with the LED backlighting on), the driver is first tested for over-current conditions with the LED backlighting off.

Next, the comparator threshold is set back to its initial threshold value. The backlight is configured to output maximum brightness. The input current is known based on the system configuration. The system configuration includes input supply voltage, number of LEDs and voltage drop across each LED at maximum current, and boost efficiency.

Allowing enough time for the system to reach a stable condition (i.e., current ramp-up to maximum value), the threshold is then slowly ramped down until the current limit comparator trips. The voltage at which the comparator tripped (VCAL) and the expected input current ($I_{INmax}$) are used to calculate $R_{DS\text{-}ON}$.

$$R_{DS\text{-}ON}=V\text{CAL}/I_{INmax}$$

$$I_{INmax}=I_{OUTmax}*V_{OUT}/(V_{IN}*Eff)$$

where $I_{INmax}$=maximum input current
$I_{OUTmax}$=maximum output current
Since the actual RDS-ON is now known, the current limit threshold (VLIMIT) is now recalculated and stored in non-volatile memory.

$$V\text{LIMIT(cal)}=I_{INmax}*R_{DS\text{-}ONcal}*m$$

where VLIMIT(cal)=calibrated current limit threshold
m is a scale factor allowing for margin
In one embodiment, m is greater than one.

To avoid very small voltage measurements during calibration, a minimum $R_{DS\text{-}ON}$ can be used for a given configuration, if voltages lower than that corresponding to the minimum $R_{DS\text{-}ON}$ are measured. In other words, if the calibration process indicates that the actual $R_{DS\text{-}ON}$ ON is very low, say even lower than a pre-set minimum $R_{DS\text{-}ON}$, then the voltage at which the comparator trips can also be very low. To avoid having to make these low voltage measurements, the calibration process can use the pre-set minimum $R_{DS\text{-}ON}$, instead of the actual $R_{DS\text{-}ON}$, to set VLIMIT(cal), which is the calibrated current limit threshold. Accordingly, in one embodiment, the calibrated threshold voltage level for current limit can be determined using a pre-set minimum drain to source "on" resistance for the power-line transistor, instead of the actual drain to source "on" resistance, when the actual drain to source "on" resistance is lower than the pre-set minimum drain to source "on" resistance.

The possible improvement in the overall accuracy of the current limit threshold ($I_{IN\text{-}LIMIT}$) used for determining an over-current condition can be quite substantial. The following example shows that the improvement in the overall accuracy of $I_{IN\text{-}LIMIT}$ used can be greater than a factor of 3 (i.e., an improvement from a 54% tolerance to a 17% tolerance).

Accuracy of the measured $R_{DS\text{-}ON}$ depends on the accuracy of the calculated $I_{INmax}$ and the accuracy of $V_{TH}$ (threshold voltage) comparator.

At the calibration comparator trip point:

$$R_{DS\text{-}ON}=V_{CAL}/I_{INmax}$$

$$I_{INmax}=I_{OUTmax}*V_{OUT}/(V_{IN}*Eff)$$

At the current limit point:

$$I_{IN\text{-}LIMIT}=V\text{LIMIT}/R_{DS\text{-}ON}$$

$$I_{IN\text{-}LIMIT}=I_{INmax}*V\text{LIMIT}/V_{CAL}$$

Therefore, accuracy of the calibrated current limit threshold is given by:

$$I_{IN\text{-}LIMIT}\text{tolerance}=\pm\sqrt{(5^2+7^2+10^2+4.5^2+10^2)}=\pm17.2\%$$

where
- VLIMIT/$V_{CAL}$ tolerance=±10% Voltage sense accuracy (VLIMIT and $V_{CAL}$ use the same reference and possibly comparator at different thresholds)
- $I_{OUT}$ tolerance=±5% Output current accuracy
- $V_{OUT}$ tolerance=±10% LED string voltage & headroom
- $V_{IN}$ tolerance=±7% at input supply 11V to 12.8V
- Eff tolerance=±4.5% (at 86% to 94% efficiency)

Figure 5:
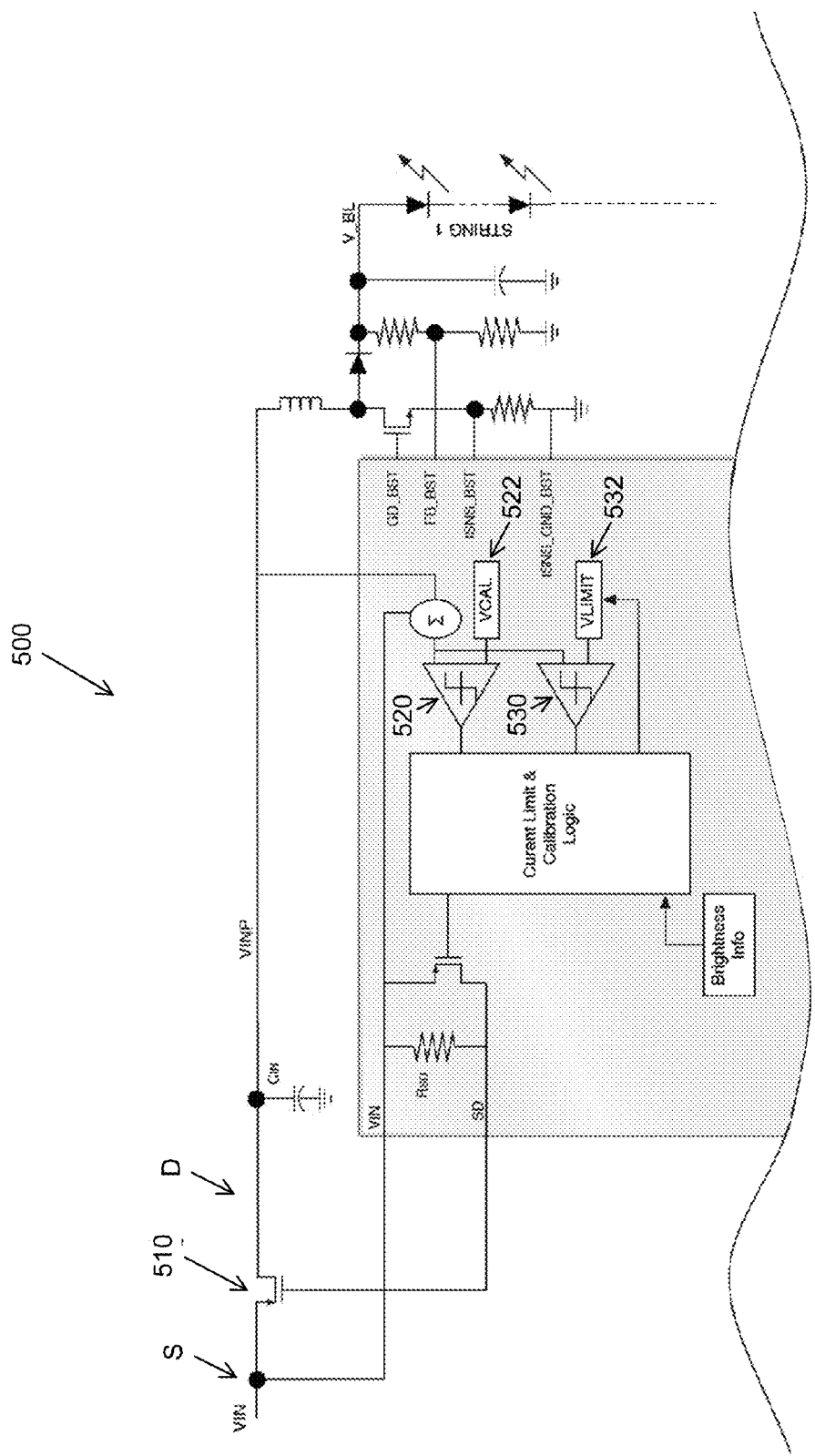
FIG. 5 illustrates a device that can use two comparators with two threshold voltages to calibrate the $R_{DS-ON}$ of a power-line transistor for accurate detection and prevention of an over-current condition.

Current Limit Sensing Using Calibrated $R_{DS-ON}$ of the Power Line Transistor Utilizing Two Thresholds FIG. 5 illustrates a device 500 that uses two comparators and two threshold voltages to calibrate the $R_{DS-ON}$ of a power-line transistor 510, so that the $R_{DS-ON}$ of the power-line transistor can be used for accurate detection and prevention of an over-current condition. The first comparator 520 is used to calibrate the $R_{DS-ON}$ of the power-line transistor 510 by accurately determining the actual $R_{DS-ON}$ using a first threshold voltage VCAL 522. The second comparator 530 is used to detect and prevent an over-current condition by tripping off device 500 when the voltage drop across the power-line transistor exceeds a second threshold voltage VLIMIT 532. In one embodiment, these two comparators functions are carried out by two different physical comparators. In another embodiment, these two comparators functions are carried out by a single physical comparator. In other words, the same comparator can be used for both thresholds (i.e., VCAL and VLIMIT), but two separate thresholds are still needed. Furthermore, the current limit threshold (i.e., VLIMIT) has an initial and a calibrated value.

Figure 6:
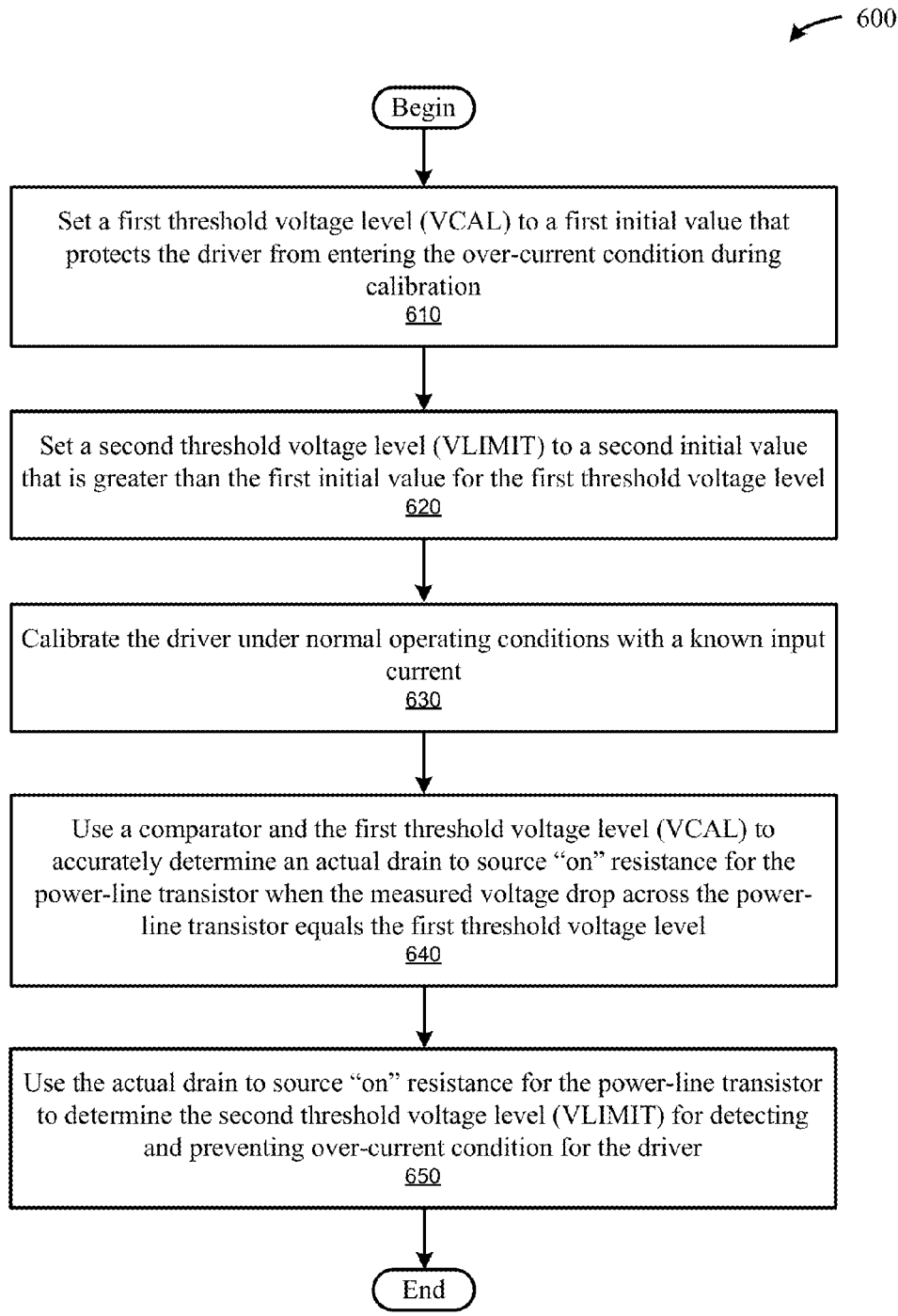
FIG. 6 is a flow chart of method steps to use two threshold voltages to calibrate the $R_{DS-ON}$ of a power-line transistor for accurate detection and prevention of an over-current condition.

FIG. 6 illustrates a method embodiment to use two threshold voltages to calibrate the $R_{DS-ON}$ of a power-line transistor and to use the accurately calibrated $R_{DS-ON}$ of the power-line transistor as the sensing element for detecting and preventing an over-current condition. In one example, this method embodiment can be implemented using a device as shown in FIG. 5, using either one or two physical comparators.

As shown in FIG. 6, the method 600 begins at step 610, where the method sets a first threshold voltage level (VCAL) to a first initial value that protects the driver from entering the over-current condition during calibration. Then, at step 620, the method set a second threshold voltage level (VLIMIT) to a second initial value that is greater than the first initial value for the first threshold voltage level (VCAL). Next, at step 630, the method calibrates the driver under normal operating conditions with a known input current. After step 630, the method proceeds to step 640, where the method uses a comparator and the first threshold voltage level (VCAL) to accurately determine an actual drain to source "on" resistance ($R_{DS-ON}$) for the power-line transistor when the measured voltage drop across the power-line transistor equals the first threshold voltage level. Then the method proceeds to step 650, where the method uses the actual drain to source "on" resistance ($R_{DS-ON}$) for the power-line transistor to determine the second threshold voltage level (VLIMIT) for detecting and preventing over-current condition for the driver. It is not shown in method 600, but, in one embodiment, the actual $R_{DS-ON}$ for the power-line transistor is used to determine a calibrated second threshold voltage level that is used to set the second threshold voltage level (VLIMIT) for detecting the over-current condition for the driver.

FIGS. 7 to 10 illustrate four different detailed examples of how a method similar to one described in FIG. 6 can be used to calibrate the $R_{DS-ON}$ of a power-line transistor and to use the accurately calibrated $R_{DS-ON}$ of the power-line transistor as the sensing element for detecting and preventing an over-current condition.

Figure 7:
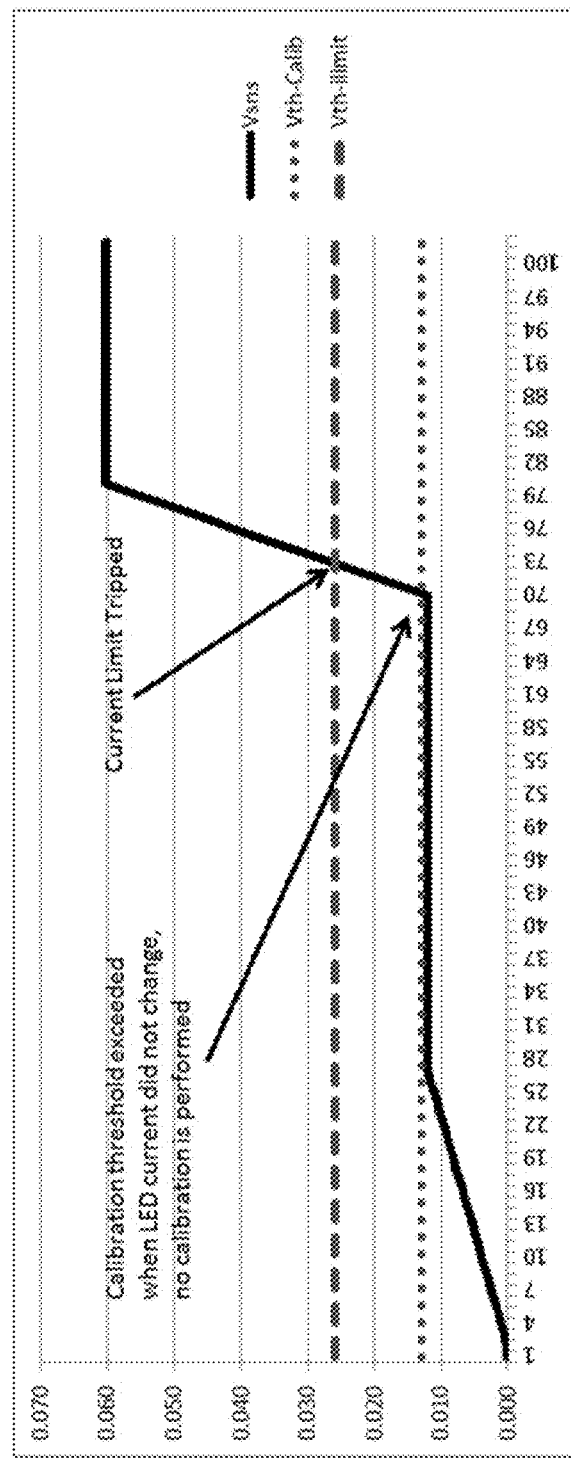
FIG. 7 illustrates a first detailed example of how a method similar to one described in FIG. 6 can be used to accurately detect and prevent over-current condition, where the calibration of $R_{DS-ON}$ does not get triggered and VLIMIT remains unchanged.

FIG. 7 illustrates a first detailed example, where the calibration of $R_{DS-ON}$ does not get triggered and VLIMIT remains unchanged. In this example, since $R_{DS-min}$ is ½ $R_{DS-ON}$, the calibration threshold gets set to half the full load condition. During normal operation, the backlight chip delivers slightly less than half of its full scale current. Calibration does not get triggered. In this example, the application parameters are as follows: Input voltage VIN equals 12V. Output voltage VOUT equals 52V. Efficiency Eff equals 90%. The maximum output current $I_{OUT-max}$ is expected to be 540 mA. $R_{DS-ON}$ is expected to be in the range of 5 mΩ to 15 mΩ, while the actual $R_{DS-ON}$ is equal to 10 mΩ. It is desired to have the current limit at $I_{OUT-max} \times 2 = 1080$ mA Based on the above application parameters, the calibration current limit $I_{OUT-calib}$ is desired to be 540 mA, while the current limit $I_{OUT-limit}$ is desired to be 1080 mA. For $I_{OUT-limit} = 1080$ mA, the input current $I_{IN-limit}$ corresponding to the input current at current limit is calculated as 5.2 A. The initial value for VLIMIT ($V_{th-ilimit}$) is calculated to be equal to 26 mV (5.2 A×5 mΩ), which assumes $R_{DS-ON}$ to be 5 mΩ (the minimum value for $R_{DS-ON}$), while $R_{DS-ON}$ is actually 10 mΩ. Similarly, the initial value for VCAL ($V_{th-calib}$) is calculated to be equal to 13 mV. In this example, VSNS, which is the sense voltage measured across the power line transistor's $R_{DS-ON}$, never exceeds $V_{th-calib}$, which is the threshold voltage corresponding to calibration current limit. Therefore, calibration is never triggered. However, when a short circuit event occurs, VSNS, which corresponds to the total current (LED current and short circuit current), will also rise rapidly. When VSNS exceeds $V_{th-ilimit}$, which is the current limit threshold, current limit comparator trips. In this example, $V_{th-ilimit} = 26$ mV corresponds to Iout=540 mA, so current limit trips when Iout_tot exceeds 540 mA.

Figure 8:
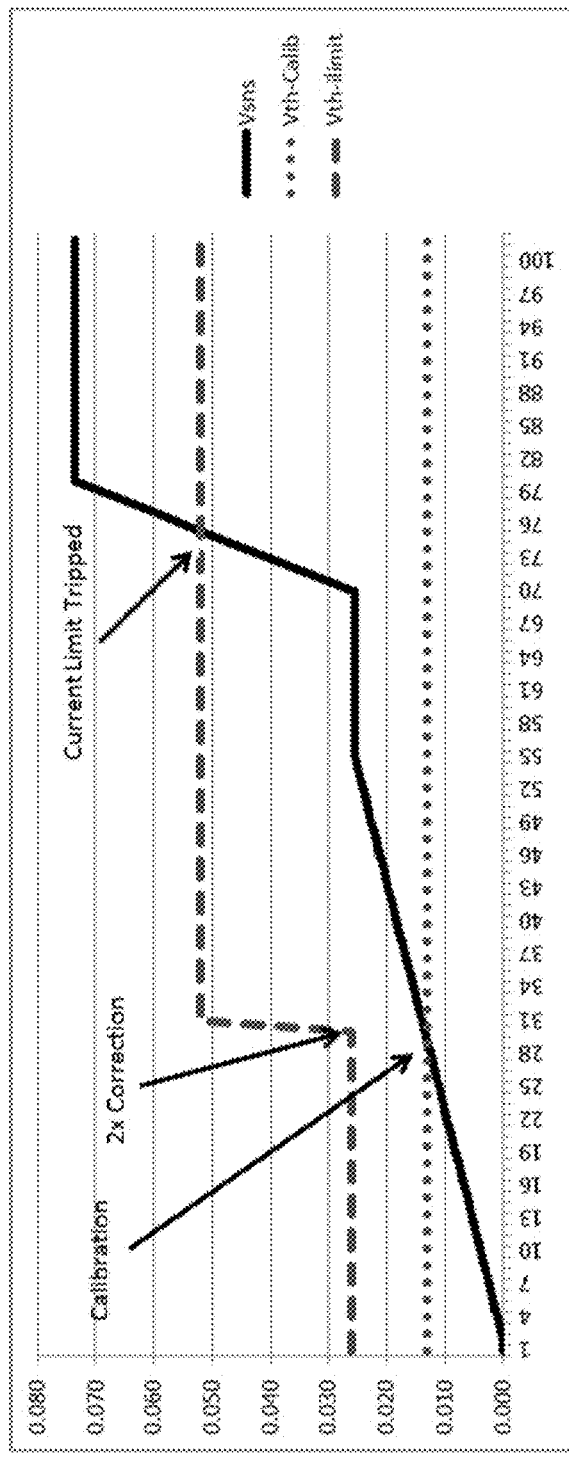
FIG. 8 illustrates a second detailed example of how a method similar to one described in FIG. 6 can be used to accurately detect and prevent over-current condition, where the calibration of $R_{DS-ON}$ gets triggered and VLIMIT gets a two times correction as a result of the calibration.

FIG. 8 illustrates a second detailed example, where calibration gets triggered and there is a 2 times correction on VLIMIT. In this example, since $R_{DS-min}$ is ½ $R_{DS-ON}$, the calibration threshold gets set to half the full load condition. During normal operation, the backlight chip delivers its maximum load current. Calibration is triggered when output current exceeds ½ of the maximum current. There is a 2 times correction on VLIMIT. In this example, the application parameters are as follows: Input voltage VIN equals 12V. Output voltage VOUT equals 52V. Efficiency Eff equals 90%. The maximum output current $I_{OUT-max}$ is expected to be 540 mA. $R_{DS-ON}$ is expected to be in the range of 5 mΩ to 15 mΩ, while the actual $R_{DS-ON}$ is equal to 10 mΩ. It is desired to have the current limit at $I_{OUT-max} \times 2 = 1080$ mA Based on the above application parameters, the calibration current limit $I_{OUT-calib}$ is desired to be 540 mA, while the current limit $I_{OUT-limit}$ is desired to be 1080 mA. For $I_{OUT-limit} = 1080$ mA, the input current $I_{IN-limit}$ corresponding to the input current at current limit is calculated as 5.2 A. The initial value for VLIMIT ($V_{th-ilimit}$) is calculated to be equal to 26 mV (5.2 A×5 mΩ), which assumes $R_{DS-ON}$ to be 5 mΩ (the minimum value for $R_{DS-ON}$), while $R_{DS-ON}$ is actually 10 mΩ. Similarly, the initial value for VCAL ($V_{th-calib}$) is calculated to be equal to 13 mV. In this example, VSNS, which is the sense voltage measured across the power line transistor's $R_{DS-ON}$, exceeds $V_{th-calib}$, which is the threshold voltage corresponding to calibration current limit, at some point in the operation. In particular, calibration is triggered when VSNS exceeds 13 mV, which is the initial calibration limit. As a result of the calibration trigger, $V_{th-ilimit}$, which is the threshold voltage for current limit, gets a 2 times correction and is increased from 26 mV to 52 mV. Consequently, the threshold voltage (VLIMIT) for current limit is set to be equal to a maximum expected input current times the actual $R_{DS-ON}$ (drain to source "on" resistance for the power-line transistor) times 2. In one embodiment, the threshold voltage (VLIMIT) for current limit can be set to be equal to a maximum expected input current times the actual $R_{DS\text{-}ON}$ (drain to source "on" resistance for the power-line transistor) times m, where m is a scale factor allowing for margin. (Please note that m is equal to 2 for the example shown in FIG. 8, because the maximum expected output current is 540 mA, but it is desired to have the current limit set at 1080 mA. This corresponds to a maximum expected input current of 2.6 A and an input current limit of 5.2 A.) Later, when a short circuit event occurs, Iout_short, which is the short circuit current, rises rapidly. VSNS, which corresponds to the total current (LED current and short circuit current), will also rise rapidly. When VSNS exceeds $V_{th\text{-}ilimit}$, which is the current limit threshold, current limit comparator trips. In this example, $V_{th\text{-}ilimit}$=52 mV corresponds to Iout=1080 mA, so current limit trips when Iout_tot exceeds 1080 mA.

Figure 9:
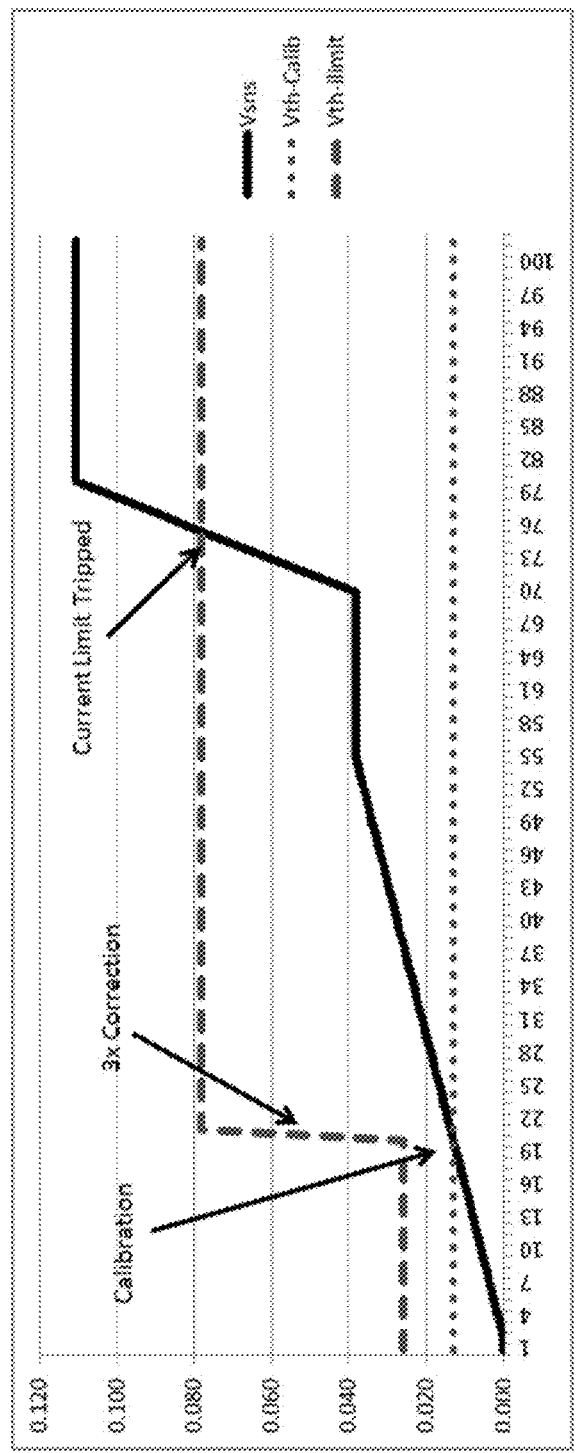
FIG. 9 illustrates a third detailed example of how a method similar to one described in FIG. 6 can be used to accurately detect and prevent over-current condition, where the calibration of $R_{DS-ON}$ gets triggered and VLIMIT gets a three times correction as a result of the calibration.

FIG. 9 illustrates a third detailed example, where calibration gets triggered and there is a 3 times correction on VLIMIT. In this example, since $R_{DS\text{-}min}$ is ⅓ $R_{DS\text{-}ON}$, the calibration threshold gets set to one third of the full load condition. During normal operation, the backlight chip delivers its maximum load current. Calibration is triggered when output current exceeds ⅓ of the maximum current. There is a 3 times correction on VLIMIT. In this example, the application parameters are the same as before, except the actual $R_{DS\text{-}ON}$ is equal to 15 mΩ: Input voltage VIN equals 12V. Output voltage VOUT equals 52V. Efficiency Eff equals 90%. The maximum output current $I_{OUT\text{-}max}$ is expected to be 540 mA. $R_{DS\text{-}ON}$ is expected to be in the range of 5 mΩ to 15 mΩ, while the actual $R_{DS\text{-}ON}$ is equal to 15 mΩ. It is desired to have the current limit at $I_{OUT\text{-}max} \times 2 = 1080$ mA Based on the above application parameters, the calibration current limit $I_{OUT\text{-}calib}$ is desired to be 540 mA, while the current limit $I_{OUT\text{-}limit}$ is desired to be 1080 mA. For $I_{OUT\text{-}limit}$=1080 mA, the input current $I_{IN\text{-}limit}$ corresponding to the input current at current limit is calculated as 5.2 A. The initial value for VLIMIT ($V_{th\text{-}ilimit}$) is calculated to be equal to 26 mV (5.2 A×5 mΩ), which assumes $R_{DS\text{-}ON}$ to be 5 mΩ (the minimum value for $R_{DS\text{-}ON}$), while $R_{DS\text{-}ON}$ is actually 15 mΩ. Similarly, the initial value for VCAL ($V_{th\text{-}calib}$) is calculated to be equal to 13 mV. In this example, VSNS, which is the sense voltage measured across the power line transistor's $R_{DS\text{-}ON}$, exceeds $V_{th\text{-}calib}$, which is the threshold voltage corresponding to calibration current limit, at some point in the operation. In particular, calibration is triggered when VSNS exceeds 13 mV, which is the initial calibration limit. As a result of the calibration trigger, $V_{th\text{-}ilimit}$, which is the threshold voltage for current limit, gets a 3 times correction and is increased from 26 mV to 78 mV. Consequently, the threshold voltage (VLIMIT) for current limit is set to be equal to a maximum expected input current times the actual $R_{DS\text{-}ON}$ (drain to source "on" resistance for the power-line transistor) times 2. In one embodiment, the threshold voltage (VLIMIT) for current limit can be set to be equal to a maximum expected input current times the actual $R_{DS\text{-}ON}$ (drain to source "on" resistance for the power-line transistor) times m, where m is a scale factor allowing for margin. (Please note that m is equal to 2 for the example shown in FIG. 9, because the maximum expected output current is 540 mA, but it is desired to have the current limit set at 1080 mA. This corresponds to a maximum expected input current of 2.6 A and an input current limit of 5.2 A.) Later, when a short circuit event occurs, Iout_short, which is the short circuit current, rises rapidly. VSNS, which corresponds to the total current (LED current and short circuit current), will also rise rapidly. When VSNS exceeds $V_{th\text{-}ilimit}$, which is the current limit threshold, current limit comparator trips. In this example, $V_{th\text{-}ilimit}$=78 mV corresponds to Iout=1080 mA, so current limit trips when Iout_tot exceeds 1080 mA.

Figure 10:
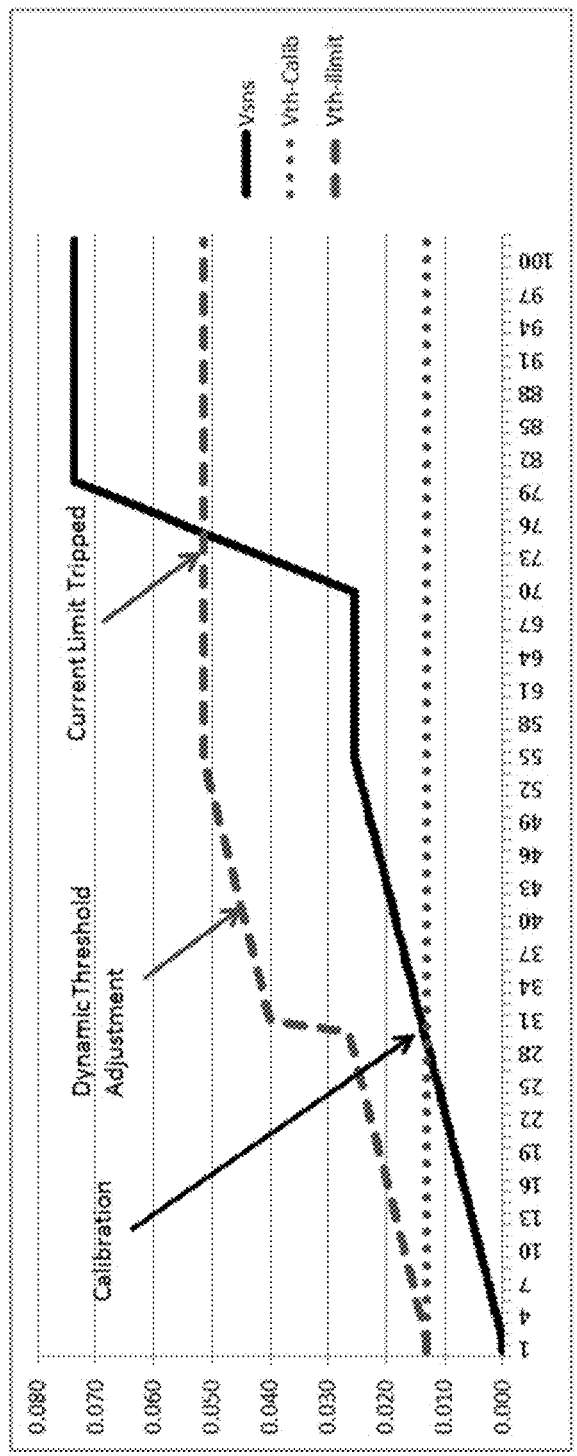
FIG. 10 illustrates a fourth detailed example of how a method similar to one described in FIG. 6 can be used to accurately detect and prevent over-current condition, where the calibration of $R_{DS-ON}$ gets triggered and VLIMIT is dynamically adjusted based on the actual load current flowing through a driver.

In the previous two examples, a fixed initial threshold is used for the current limit and, after calibration is triggered, this limit is increased to another fixed threshold. In another embodiment, VLIMIT is dynamically adjusted based on the actual load current flowing through a driver, and, once the calibration is triggered, the threshold is increased by a fixed amount but still tracks the expected output current. This will make it possible to have a lower threshold for cases when the LED driver is not driving its maximum possible output current load. FIG. 10 shows this example, where calibration gets triggered and VLIMIT is dynamically adjusted based on the actual load current flowing through a driver. Some of the application parameters of this example are similar to those featured in the FIG. 8 example. For example, $R_{DS\text{-}min}$ is ½ $R_{DS\text{-}ON}$, so the calibration threshold gets set to half the full load condition. During normal operation, the backlight chip delivers its maximum load current. Calibration is triggered when output current exceeds ½ of the maximum current. The calibration performs a 2 times correction on $V_{th\text{-}ilimit}$. In this example, the application parameters are as follows: Input voltage VIN equals 12V. Output voltage VOUT equals 52V. Efficiency Eff equals 90%. The maximum output current is expected to be 540 mA. $R_{DS\text{-}ON}$ is expected to be in the range of 5 mΩ to 15 mΩ, while the actual $R_{DS\text{-}ON}$ is actually equal to 10 mΩ.

Based on the above application parameters, both the initial calibration current limit $I_{OUT\text{-}calib}$ and the initial current limit threshold current $I_{OUT\text{-}limit}$ are initially desired to be 540 mA. The initial value for VLIMIT ($V_{th\text{-}ilimit}$) is calculated to be equal to 13 mV (2.6 A×5 mΩ), which assumes $R_{DS\text{-}ON}$ to be 5 mΩ (the minimum value for $R_{DS\text{-}ON}$), while $R_{DS\text{-}ON}$ is actually 10 mΩ. During the operation, the threshold voltage VCAL ($V_{th\text{-}calib}$) corresponding to the calibration current limit stays fixed, but the current limit threshold voltage VLIMIT ($V_{th\text{-}ilimit}$) is made to track the increase in the LED current. In other words, the current limit threshold VLIMIT ($V_{th\text{-}ilimit}$) is set based on an actual current flowing through the backlight chip. In this example, VSNS, which is the sense voltage measured across the power line transistor's $R_{DS\text{-}ON}$, exceeds $V_{th\text{-}calib}$, which is the threshold voltage corresponding to calibration current limit, at some point in the operation. In particular, calibration is triggered when VSNS exceeds 13 mV, which is the initial calibration limit. As a result of the calibration trigger, $V_{th\text{-}ilimit}$, which is the threshold voltage for current limit, gets a correction and is increased as shown in FIG. 10. Please note that both Iout_limit and $V_{th\text{-}ilimit}$ are being dynamically adjusted based on the actual load current flowing through a driver, as shown in FIG. 10. Later, when a short circuit event occurs, Iout_short, which is the short circuit current, rises rapidly. VSNS, which corresponds to the total current (LED current and short circuit current), will also rise rapidly. When VSNS exceeds $V_{th\text{-}ilimit}$, which is the current limit threshold, current limit comparator trips. In this example, $V_{th\text{-}ilimit}$=52 mV corresponds to Iout=1080 mA, so current limit trips when Iout_tot exceeds 1080 mA.

Returning to method 600 (FIG. 6) as applied to device 500 (FIG. 5), in one embodiment, once the VCAL threshold is exceeded, a flag can be set to report the event. The value of the output current at that point has useful information about the $R_{DS\text{-}ON}$ of the power-line transistor and can be saved in a register. If the Calibrate Comparator 520 is tripped at an unusually low current, that can be an indication of a fault with the power-line transistor or other unusual conditions with the input supply connection.

In one embodiment, once the VLIMIT Comparator (530) threshold is exceeded, a flag must be set and the current path must be either clamped at a safe value or completely turned off by switching off the power-line transistor 510.

In one embodiment, to account for the effects of temperature on the $R_{DS-ON}$ of the power-line transistor, both VCAL and VLIMIT thresholds can be adjusted according to a measured temperature and the expected thermal coefficient of the $R_{DS-ON}$ as provided by the power-line transistor manufacturer.

In-Rush Current Control

LED (light emitting diode) backlighting for LCD (liquid crystal display) display uses a boost converter chip to generate the voltage needed to drive the string of LEDs required to backlit a screen. When the boost converter chip is first turned on to supply power to the backlighting LEDs, a large instantaneous input current, known as the in-rush current, is drawn by the capacitors at the input and output of the boost converter. Because the boost converter is associated with a lot of capacitance, turning on the boost converter chip loads the input power supply very heavily as it tries to fill up all the capacitors. This results in a huge instantaneous in-rush current. It is, therefore, desirable to have an accurate control of the in-rush current. Further, if a short circuit is detected on the output side of the boost converter chip during the in-rush period, quick turn off of the in-rush current is needed to protect the boost converter chip, as well as other circuits. It is, therefore, also desirable to reduce the turn-off time of the in-rush current flowing through the power-line transistor. Accordingly, FIGS. 11 and 12 illustrate a device and a method, respectively, to improve in-rush current control and reduce the turn-off time of the in-rush current flowing through the power-line transistor.

Figure 11:
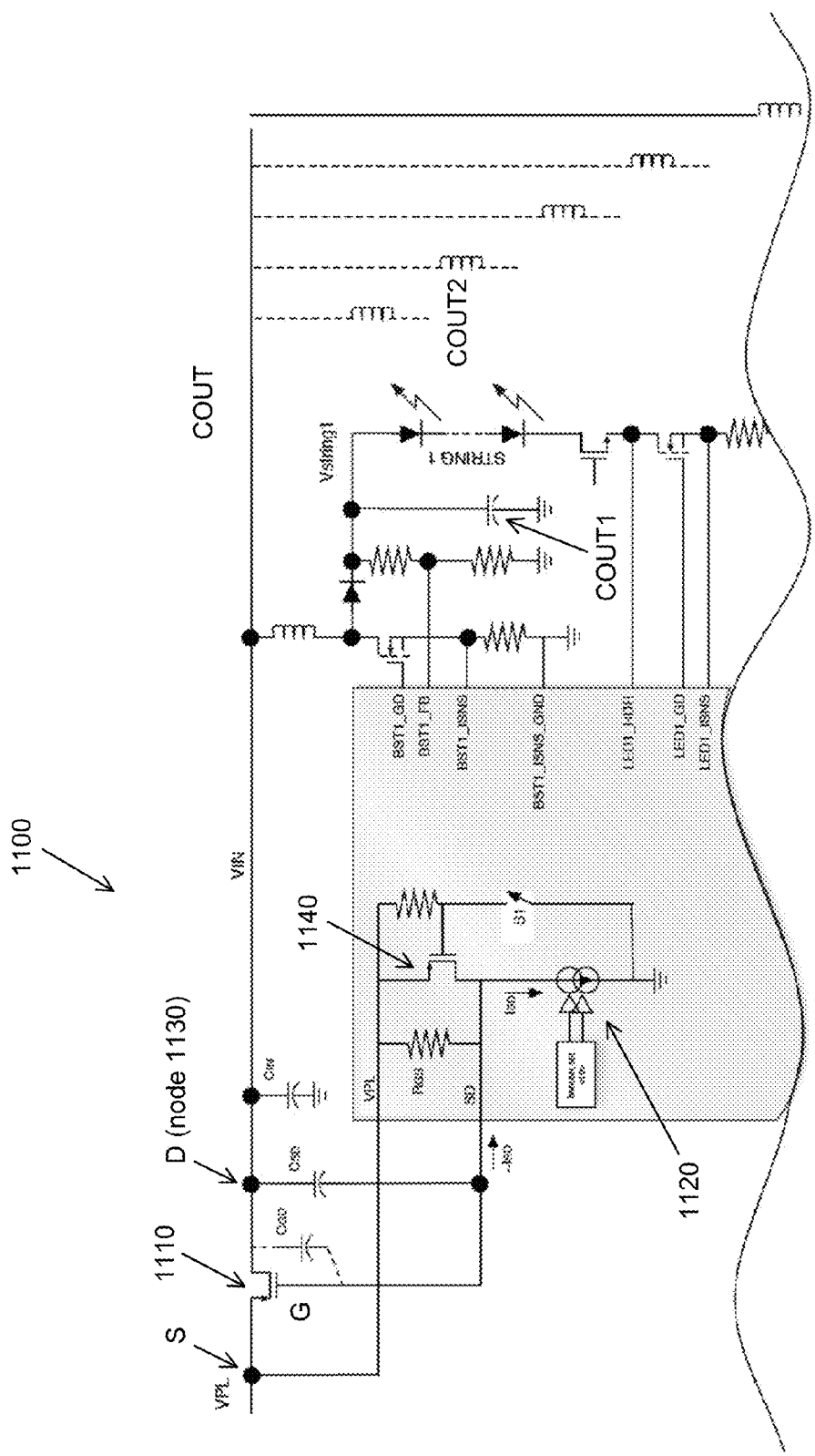
FIG. 11 illustrates a device for controlling in-rush current and reducing the turn-off time of the in-rush current flowing through the power-line transistor.
Figure 12:
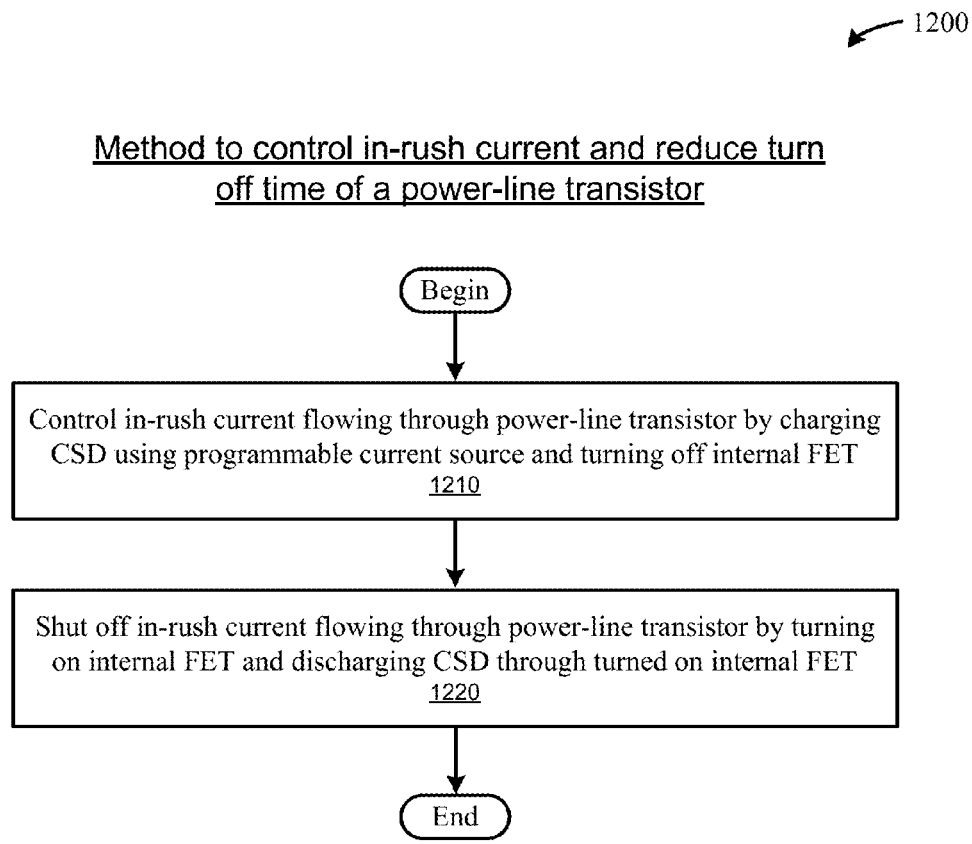
FIG. 12 is a flow chart of method steps to control in-rush current and reduce turn off time of a power-line transistor.

FIG. 11 illustrates a device 1100 for controlling the in-rush current that will help to improve the accuracy of the in-rush current and reduce the turn-off time of the in-rush current flowing through the power-line transistor. In one embodiment, the power-line transistor can be a FET (field effect transistor). In one embodiment, the power-line transistor can be a high frequency MOSFET (metal-oxide-semiconductor field effect transistor).

In FIG. 11, a boost converter device can supply power to backlighting LEDs. The output current of device 1100 is controlled by a power-line transistor 1110. Current through the power-line transistor 1110 can be control by using a programmable current source 1120 to charge an external capacitor CSD. This in turn controls the rate of voltage change at node 1130 (which correspond to the drain side of the power-line transistor) and consequently the current flowing through node 1130 to charge up any capacitance beyond node 1130. The capacitance beyond node 1130 includes CIN and COUT, where COUT represents the output capacitor placed for each of the LED strings to be powered up by device 1100.

When device 1100 is first turned on to supply power to the backlighting LEDs, the maximum, instantaneous input current drawn by the capacitors is known as the in-rush current. In FIG. 11, the in-rush current and the in-rush period are controlled by the programmable internal bias current ISD and the external capacitor CSD, since the in-rush current is being supplied by the power-line transistor.

Before device 1100 is enabled, it is in a shut-down state and has no power flowing through the power-line transistor. While in this shut-down state, ISD is zero and the switch S1 is left open. The internal resistor RGS pulls the VGS (gate voltage, relative to source) of the power-line transistor to zero, keeping the power-line transistor off. Once the boost converter device 1100 is enabled, the bias current ISD starts to pull current through the capacitor CSD and the parasitic gate to drain capacitance of the power-line transistor, CGD. The switch S1 stays open. Charging of these capacitances pulls the gate voltage (VGS) of the power-line transistor negative until the power-line transistor turns on and the current through it starts to charge the capacitances on the drain side which include CIN and COUT (COUT=COUT1+COUT2+ . . . ). At this point, the charging rate of CIN and COUT must match the charging rate of CSD and CGD. This will give rise to a constant current flow through the power-line transistor charging CIN and COUT.

Assuming the internal resistor RGS is large and the current through it is much less than ISD, the in-rush current, Iinrush, and the in-rush period, tinrush can be calculated as:

$$Iinrush=ISD\times(CIN+COUT)/(CSD+CGD)$$

$$tinrush=VIN\times(CSD+CGD)/ISD$$

When a short circuit is detected at the output (i.e., there is a short circuit among the LEDs), backlighting device 1100 needs to be turned off quickly in order to protect device 1100 and other circuits. During this turn off, power-line transistor 1110 is shut off to discontinue the power supply to backlighting LEDs. Short circuit condition during in-rush can be detected by monitoring the output voltage of the boost converter device 1100. In case of a short circuit at the output, the voltage across the capacitor will not be rising as expected.

Once a short circuit is detected, the power-line transistor 1110 is turned off by turning on the switch S1. Since switch S1 turns on an internal PMOS transistor 1140 with a relatively low Rds-on (internal resistance between drain and source, when the transistor is on), the turning off of the power-line transistor is very quick and it depends on the Rds-on of the PMOS transistor 1140 and the CGS of the power-line transistor.

$$\text{Discharge Time Constant }(TC)=Rds\text{-on}\times CGS$$

$$\text{Discharge Current}=(VIN/Rds\text{-on})\times(\exp(-t/TC))$$

If no short circuit is detected, the in-rush period continues as expected and the output capacitors are charged at the controlled rate. Once the in-rush period has completed and the output capacitors are charged to near the input voltage VIN, the boost soft-start period is started followed by the normal boost operation. During the boost soft-start and boost normal operation, the power-line transistor is fully turned on with the channel in the linear region of operation.

One distinct advantage of the embodiment shown in FIG. 11 is provided by including switch S1 and internal PMOS transistor 1140 in boost converter device 1100. When power-line transistor 1110 is turned off, any charge residing on capacitor CSD needs to be discharged through a resistor. In the absence of switch S1 and internal PMOS transistor 1140, this discharge will be occurring solely through resistor RGS. Since typical resistance values can be 10 ohms for Rds-on and 10 M ohms for RGS, most of the discharge current will be flowing through Rds-on. Therefore, any discharge with a boost converter device that has the switch S1 and the PMOS transistor 1140 will be much faster. Further, even if a much lower resistance value, say 70 k ohms, is used for RGS, any discharge with a boost converter device that has the switch S1 and the PMOS transistor will still be much faster. Additionally, the resistance value of RGS needs to be high, so that as little of the ISD current as possible will flow through RGS during the in-rush period when the boost converter device 1100 is turned on. This is to ensure that all of the ISD current is being used to charge CSD/CGD and not flow through RGS during the in-rush period when the boost converter device 1100 is turned on. By having all of the ISD current used to charge CSD/CGD, control of the power-line transistor current is improved and accuracy of the in-rush current control will be enhanced. If, on the other hand, RGS has a low resistance value so that more current is flowing through RGS, then it will be difficult to control the power-line transistor current and accuracy of the in-rush current control will be reduced.

FIG. 12 shows a flow chart of steps for a method to control in-rush current and reduce turn off time of a power-line transistor. The method includes a step 1210, where the method controls an in-rush current flowing through the power-line transistor by charging a capacitor connected to a drain side of the power-line transistor using a programmable current source and turning off an internal transistor that can discharge the capacitor. The method further includes a step 1220, where the method shuts off the in-rush current flowing through the power-line transistor by turning on the internal transistor and discharging the capacitor connected to the drain side of the power-line transistor through the turned on internal transistor.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A device configured for accurate detection and prevention of an over-current condition at an output of the device, the device comprising:
   a power converter configured for converting an input power from an external supply to an output power at the output of the device;
   a power-line transistor configured for switching on and off the input power from the external supply; and
   a comparator configured for comparing a measured voltage drop across the power-line transistor with a threshold voltage level,
      wherein an actual drain to source "on" resistance for the power-line transistor is determined by applying an input current through the power-line transistor and ramping down the threshold voltage level from an initial value until the measured voltage drop across the power-line transistor equals the threshold voltage level,
      wherein the actual drain to source "on" resistance for the power-line transistor is used to detect and prevent the over-current condition for the device at the output of the device.

2. The device of claim 1,
   wherein the actual drain to source "on" resistance for the power-line transistor is used to determine a calibrated threshold voltage level, and
   wherein the over-current condition for the device occurs when the measured voltage drop across the power-line transistor exceeds the calibrated threshold voltage level.

3. The device of claim 2 further comprising:
   a logic configured for switching on and off the power-line transistor,
      wherein the power-line transistor is switched off when the over-current condition for the device occurs.

4. The device of claim 3 wherein the power converter is a boost converter for a light emitting diode backlight.

5. A method to accurately detect and prevent an over-current condition for a driver using a measured voltage drop across a power-line transistor for the driver, the method comprising:
   setting a threshold voltage level to an initial value;
   calibrating the driver with an input current;
   comparing, with a comparator, the measured voltage drop across the power-line transistor with the threshold voltage level while the threshold voltage level is ramping down from the initial value;
   tripping the comparator to generate a tripped threshold voltage level when the measured voltage drop across the power-line transistor equals the threshold voltage level;
   using the tripped threshold voltage level and the input current to accurately determine an actual drain to source "on" resistance for the power-line transistor; and
   using the actual drain to source "on" resistance for the power-line transistor to detect and prevent the over-current condition for the driver.

6. The method of claim 5, wherein using the actual drain to source "on" resistance for the power-line transistor to detect and prevent the over-current condition for the driver comprises:
   using the actual drain to source "on" resistance for the power-line transistor to determine a calibrated threshold voltage level,
   wherein the over-current condition for the driver occurs when the measured voltage drop across the power-line transistor exceeds the calibrated threshold voltage level;
   switching off the power-line transistor when the over-current condition for the driver occurs.

7. The method of claim 6, wherein the driver is a boost converter for a light emitting diode backlight.

8. The method of claim 6, wherein the input current is based on a system configuration, the system configuration comprising:
   an input supply voltage,
   a number of LEDs,
   a voltage drop across each LED of the number of LEDs at a maximum current, and
   a boost efficiency.

9. The method of claim 6, wherein the calibrated threshold voltage level is set to be equal to a maximum expected input current times the actual drain to source "on" resistance for the power-line transistor times m,
   wherein m is a scale factor allowing for margin.

10. The method of claim 6, wherein the calibrated threshold voltage level is stored in a non-volatile memory.

11. The method of claim 6, wherein the initial value of the threshold voltage level is set to be equal to a maximum expected input current times a minimum expected drain to source "on" resistance for the power-line transistor times k,
   wherein k is a scale factor allowing for margin,
   wherein the initial value protects the driver from entering the over-current condition during calibration.

12. The method of claim 11 further comprising:
   before starting the step of calibrating the driver under normal operating conditions, testing the driver for the over-current condition with an LED backlighting off.

13. The method of claim 12, wherein testing the driver for the over-current condition with the LED backlighting off comprises:
- setting the threshold voltage level to the initial value;
- operating the driver with the LED backlighting off;
- comparing the measured voltage drop across the power-line transistor with the threshold voltage level while the threshold voltage level is ramping down from the initial value;
- tripping the driver when the measured voltage drop across the power-line transistor exceeds the threshold voltage level;
- determining that there are no existing short or over-current conditions when the driver does not trip or the driver trips at a very low voltage; and
- determining that there are existing short or over-current conditions when the driver trips at a high voltage.

14. The method of claim 6, wherein the calibrated threshold voltage level is determined using a pre-set minimum drain to source "on" resistance for the power-line transistor when the actual drain to source "on" resistance is lower than the pre-set minimum drain to source "on" resistance.

15. The method of claim 6, wherein calibrating the driver under normal operating conditions with the input current comprises:
- ramping a current up to a maximum value, and
- allowing enough time for the driver to reach a stable condition.

16. A method to use at least two threshold voltage levels and a measured voltage drop across a power-line transistor for a driver to accurately detect and prevent an over-current condition for the driver, the method comprising:
- setting a first threshold voltage level to a first initial value that protects the driver from entering the over-current condition during calibration;
- setting a second threshold voltage level to a second initial value that is greater than the first initial value for the first threshold voltage level;
- calibrating the driver under normal operating conditions with an input current;
- using a comparator and the first threshold voltage level to determine an actual drain to source "on" resistance for the power-line transistor when the measured voltage drop across the power-line transistor equals the first threshold voltage level while the first threshold voltage level is ramping down from the first initial value;
- using the actual drain to source "on" resistance for the power-line transistor to determine the second threshold voltage level for detecting and preventing the over-current condition for the driver.

17. The method of claim 16, wherein using the actual drain to source "on" resistance for the power-line transistor to determine the second threshold voltage level for detecting and preventing the over-current condition comprises:
- using the actual drain to source "on" resistance for the power-line transistor to determine and set a calibrated second threshold voltage level,
- wherein the over-current condition for the driver occurs when the measured voltage drop across the power-line transistor exceeds the calibrated second threshold voltage level;
- switching off the power-line transistor when the over-current condition for the driver occurs.

18. The method of claim 17, wherein the calibrated second threshold voltage level is set to be equal to a maximum expected input current times the actual drain to source "on" resistance for the power-line transistor times m, wherein m is a scale factor allowing for margin.

19. The method of claim 17, wherein the calibrated second threshold voltage level is dynamically adjusted and set based on an actual load current flowing through the driver.

20. The method of claim 17, wherein the driver is a boost converter for a light emitting diode backlight.

\* \* \* \* \*